UNITED STATES PATENT OFFICE.

ALBERT ADAMS, OF SPRINGFIELD, MASSACHUSETTS.

IMPROVED METHOD OF PREVENTING THE COATING OF PIPES USED IN MASH-TUNS.

Specification forming part of Letters Patent No. 57,454, dated August 28, 1866.

*To all whom it may concern:*

Be it known that I, ALBERT ADAMS, of Springfield, Hampden county, Commonwealth of Massachusetts, have invented a new and Improved Mode of Preventing the Coating of the Pipes During the Process of Drawing Off Mashes and similar semi-fluid substances; and I do hereby declare that the following is a full and exact description thereof.

My said process I will now describe. In this description I shall consider it as applied to the process of distilling whisky from rye, although the same invention may be employed in various other situations, as I will more fully describe hereinafter.

In distilling whisky from rye, the grain, in a moist or semi-fluid state, called "mash," is placed in a vat, tub, or suitable receptacle, and a coil of pipe is passed through this mash. Steam is let on at one end of this pipe, and allowed to blow off at the other, so that in passing through the pipe the mash is thoroughly heated.

Now, this apparatus works very well, the best, in fact, of any in use, as long as the mash remains in the tub or vat; but when it is drawn off the steam remaining passing through that part of the mash near the pipes forms a crust on them by drying thereon, which soon becomes so thick as to interfere with the heating of the mash.

To obviate this is the object of this invention; and I do it in the simplest manner, by shutting off the steam from the pipes and letting cold water run through them in the place of the steam, so that, the pipes being cooled inside and warm outside, a dew or moisture is formed on their outside surface, causing the mash, which would otherwise adhere to the pipes, to slip off, so that the whole may be drawn off, leaving the pipes clean. The water is then shut off from the pipes, and, the vat being filled with a new mash, steam is again let on and the heating and distilling process renewed.

As before mentioned, this process can be used in other situations, and, in fact, in any where a substance similar in consistency to that described is heated by means of a pipe through which steam is passed.

The great utility of this invention will readily be seen, rendering possible, as it does, a cheap and simple method of distilling, which heretofore has been attended with so much difficulty from the cause mentioned as to render it almost useless.

Now, having described my invention, what I claim as new, and desire to secure by Letters Patent, is—

The process herein described of passing cold fluid through the pipes ordinarily used for heating a semi-fluid substance when the same is used substantially in the manner and for the purpose herein set forth.

ALBERT ADAMS.

Witnesses:
J. B. GARDINER,
J. E. FULLER.